April 27, 1954   A. C. HALTER   2,677,080
STRIP TENSIONING SYSTEM RESPONSIVE TO TWO FLUID PRESSURES
Filed Sept. 17, 1949
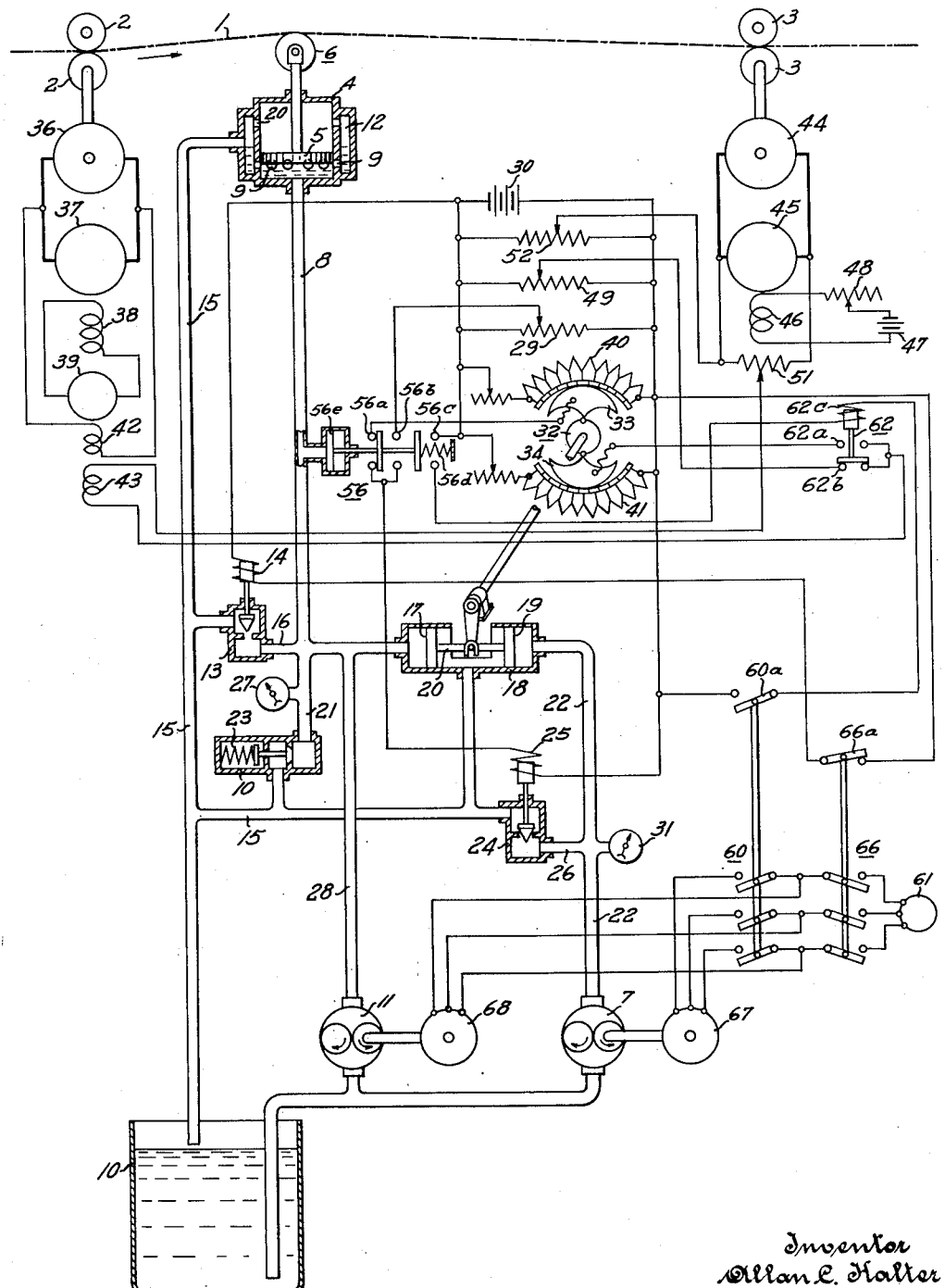
Inventor
Allan C. Halter
by Didier Journeaux
Attorney Patented Apr. 27, 1954

2,677,080

UNITED STATES PATENT OFFICE 2,677,080

STRIP TENSIONING SYSTEM RESPONSIVE TO TWO FLUID PRESSURES

Allan C. Halter, Milwaukee, Wis., assignor to Allis-Chalmers Manufacturing Company, Milwaukee, Wis., a corporation of Delaware Application September 17, 1949, Serial No. 116,249

4 Claims. (Cl. 318—7)

This invention relates in general to a system for regulating and indicating the tension in a strip of material moving between sets of operation performing rolls in a strip mill.

Prior art control systems and apparatus of this type have usually varied the pressure of a fluid in accordance with changes in the tension of the strip and opposed this variable fluid pressure with some mechanical force or element, such as a spring, to produce a differential force for operating a controlling element. Such systems required a sensitive and easily disturbed adjustment of the elements, which is a disadvantage when a rugged regulating system is required. A further disadvantage of such systems is that only relatively small forces are available to balance the regulator, necessitating considerable movement of the controlling element to produce the required controlling effect. An additional disadvantage of such systems is that the controlling effect produced is directly proportional to the amount of correction required.

These disadvantages can be overcome by balancing the variable fluid pressure against a constant pressure and utilizing the differential pressure to actuate a controlling element. Such a system is easily adjustable and owing to the large forces available in the fluid pressure systems, a large controlling effect is produced in response to a comparatively small movement of the differential element. An additional advantage of such systems is that the regulator is completely astatic, that is, the regulator produces a controlling effect which is not dependent upon the amount of the deviation of the regulated quantity from the normal value. It is also desirable in strip tensioning systems to maintain an approximately correct adjustment of the tension regulating equipment while no tensioned strip is between the rolls, so as to enable the strip to assume tension smoothly when it enters the rolls of the mill.

It is therefore an object of this invention to provide an improved tension indicating and regulating system which requires only a slight movement of a tension responsive element to control a large amount of power in the tension regulating equipment.

It is also an object of the present invention to provide a tension regulating system for traveling strip material in which the control of the tension in the strip is effected proportionally to operating conditions of the regulating equipment.

It is a further object of this invention to provide a strip tension indicating and regulating system in which an approximately correct adjustment of the tension regulating equipment is maintained in the absence of a strip between the operation performing rolls.

Objects and advantages other than those stated above will be apparent from the following description when read in connection with the accompanying drawing, which diagrammatically illustrates one embodiment of the invention.

The drawing shows the invention embodied in a control system for a tandem rolling mill assuming the system to be out of operation. Rolls 2 and 3 of the first and second stands of the mill are adapted to move a strip 1 in the arrow direction through the mill. A hydraulically operated tensiometer is utilized to regulate and indicate the tension in the strip. This tensiometer is fully described and claimed in U. S. Patent 2,348,695, granted to Harold Reichert.

Briefly, this tensiometer comprises a cylinder 4 in which a piston 5 is supported by fluid pressure for holding a roll 6 against the strip 1. A pump of the constant delivery type, represented in the drawing as a gear pump 11, supplies cylinder 4 with a suitable fluid under pressure such as oil, through pipes 8 and 28, from a reservoir 10. Discharge openings 9 are provided between the cylinder 4 and a reservoir 12 communicating with reservoir 10 through a pipe 15. The flow of oil through openings 9 is controlled by very slight movement of the piston 5, which opens or restricts these openings so that the pressure in the oil beneath the piston 5 is always equal to the pressure of the strip 1 on the roll 6. The tensiometer thus cooperates with pump 11 to provide a supply of fluid under a pressure depending on the tension of the strip. Oil leaking past piston 5 in cylinder 4 drains into reservoir 12 through ports 20.

As the piston 5 maintains substantially the same position regardless of the tension of the strip, the extent of the deflection of the strip by roll 6 is substantially constant and the fluid pressure in the cylinder 4 is an accurate measure of the tension of the strip 1. This pressure is indicated by the gauge 27 which may be calibrated in pounds tension in the strip. A solenoid valve 13 having an energizing coil 14 may be provided in a pipe 16 joining pipes 8 and 15 for controlling the drainage of oil from cylinder 4 and pipe 8 when the system is to be shut down. A safety relief valve 10 is provided in a pipe 21 joining pipes 8 and 15 for protecting the system against excessive pressure. Valve 10 is maintained normally closed by a spring 23 but opens upon occurrence of excessive pressure in pipes 8 and 21 to allow oil to drain into reservoir 10 until the pressure returns to normal.

The variations of the fluid pressure in the cylinder 4 in response to variations in the tension of the strip are also utilized to regulate the tension in the strip 1 by regulating the torque of a motor 36 driving the rolls 2 of the first stand of the rolling mill. The pressure in the cylinder 4 is transmitted through pipe 8 to one face 17 of a double piston movable within a cylinder 18. The other face 19 of the double piston is acted on by fluid under constant pressure supplied through a pipe 22 from a second constant delivery pump 7, which pump also receives its supply of oil from reservoir 10. Pumps 7 and 11 are driven by motors 67 and 68, respectively, which are supplied from any suitable alternating current source such as a generator 61. Piston faces 17 and 19 are connected by piston rod 20. Piston rod 20 actuates a regulator 32, comprising a sector 33 and a sector 34, in either of two directions from a neutral position, and is differentially responsive to the pressures of the two fluid supplies applied to the faces 17 and 19 of the double piston. The sectors are rocked by piston rod 20 to form adjustable taps for two voltage dividers 40, 41, respectively, and thereby provide rheostat means differentially responsive to the pressures of the two fluid supplies.

A solenoid valve 24 provided with an energizing coil 25 is inserted in a pipe 26 for regulating an orifice in the line returning fluid discharged by pump 7 to reservoir 10, to thereby regulate the pressure of the fluid acting on face 19 of the double piston. A voltage divider 29 is provided for controlling the excitation of solenoid valve coil 25 from a suitable source such as a battery 30. Pressure gauge 31, calibrated in pounds tension in the strip, measures the discharge pressure of pump 7 to indicate the strip tension for which the system is regulating.

The mill rolls are driven by separate electric motors 36, 44 for simultaneously working strip 1. The rolls 2 of the first stand of the mill are driven by motor 36, which is supplied with current by a generator 37 in a closed loop circuit. Generator 37 is provided with a field winding 38, the excitation of which is supplied by an exciter generator 39. Exciter generator 39 is in turn provided with opposed field windings 42 and 43, the relative energization of which determines the output of generator 39. It is to be understood that additional exciter generators in cascade could be utilized if needed to provide additional amplification.

The rolls 3 of the second stand of the mill are driven by a motor 44 which is supplied with current by a generator 45 in a closed loop circuit. Field winding 46 of generator 45 is supplied with adjustable excitation from any suitable source 47 through a rheostat 48.

A solenoid operated switch 62 having an energizing coil 62c and contacts 62a and 62b is provided for selectively energizing exciter field winding 43, as will be more fully explained hereinafter.

A manually operated selector switch 60 provides for selecting manual or automatic operation of the regulating system. Pump motors 67 and 68 are energized from source 61 through the main contacts of a switch 66, when the switch 60 is moved upward, and only motor 68 is energized when the switch 60 is moved downward. The upper position of switch 60, provides for automatic operation of the system, while the lower position of switch 60 provides for manual operation of the system. Auxiliary contact 60a of switch 60 is connected in the circuit of solenoid coil 62c and is closed when switch 60 is moved to its upper or "automatic" position.

A pressure operated switch 56 provided with contacts 56a, 56b and 56c is connected to pipe 8 to be responsive to the pressure in cylinder 4, for controlling the energization of coil 25 of solenoid valve 24 and coil 62c of switch 62. In the absence of a strip between stands, a spring 56d maintains switch 56 in the position shown, closing contacts 56a and connecting solenoid valve coil 25 to regulator sector 33 and source 30. With a strip between stands the fluid pressure in pipe 8 forces switch piston 56e to a position to open contacts 56a and to close contacts 56b and 56c. Closure of contacts 56b connects solenoid coil 25 to tension adjusting voltage divider 29 and source 30, and closure of contacts 56c connects coil 62c with source 30 when contact 60a is closed.

When the system is automatically regulating the tension in strip 1, the excitation of exciter field winding 43 is supplied jointly by battery 30 and generator 45. The circuit of winding 43 extends from generator 45 through a voltage divider 51, which furnishes a controlling effect in the form of a voltage proportional to the voltage of motor 44, winding 43, contacts 62a of solenoid switch 62, regulator sector 34, resistor 41, and speed adjusting rheostat 52 back to generator 45. Exciter field winding 42 is connected across motor 36, thereby receiving a controlling effect in the form of excitation proportional to the voltage of motor 36. Regulator 32 and voltage divider 51 cooperate to impress on winding 43 a voltage which causes the ampere turns of winding 43 to predominate over the ampere turns of winding 42. The difference between the ampere turns is just sufficient to cause generator 37 to supply a voltage which will produce in motor 36 the torque required to maintain the strip tension at the desired value. A change in the position of sector 34 will change the ampere turns of winding 43, causing exciter generator 39 to generate a new voltage, thereby changing the torque of motor 36 and the tension of the strip 1.

It will be understood that the system would function properly if exciter winding 43 alone were utilized to provide excitation for exciter generator 39. However, the use of opposed fields results in greater sensitivity of the system, since the differential action produced by the voltage of motor 36 on field winding 42 and the voltage impressed on winding 43 causes a large change in the value of the excitation flux of exciter 39 in response to a relatively small change in the voltage applied to the circuit of winding 43. In addition, the voltage of motor 44 impressed on field winding 43 produces a coarse adjustment of strip tension and the additional regulating effect provided by sector 34 on the excitation of field winding 43 merely gives a fine adjustment of the tension.

Voltage dividers 29, 40, 41, 49 and 52 are energized from any suitable source such as a battery 30.

With the foregoing understanding of the elements and their organization, the operation of the system to regulate the tension in the strip will readily be understood from the following detailed description.

The operation of the system to automatically regulate the tension in strip 1 will first be described. Selector switch 60 is moved to its upper or "automatic" position, and upon closure of main line switch 66, motors 67 and 68 are energized to drive pumps 7 and 11.

Closure of switch 60 in the "automatic" position closes contact 60a of switch 60 in the circuit of solenoid coil 62c, but the coil remains deenergized since contacts 56c are open at this time. Opening of contact 66a of switch 66 deenergizes previously energized coil 14 of pressure relief valve 13, and the valve closes to enable pump 11 to supply fluid to cylinder 4 through pipes 8 and 28.

Before the strip 1 is threaded through the rolls, piston 5 rises above ports 9, so that the fluid pressure in pipe 8 is due only to the weight of roller assembly 6. This pressure is applied to piston face 17 and acts against the pressure applied to piston face 19. Pressure switch 56 is not actuated by the pressure created in pipe 8 by the weight of roller assembly 6, and therefore the switch 56 remains in the position shown, in which contacts 56a are closed to connect coil 25 of solenoid valve 24 with battery 30 through a circuit comprising coil 25, contacts 56a, sector 33 and voltage divider 40, back to the battery. Sector 33 then adjusts the excitation of coil 25 to adjust the fluid pressure against piston face 19 to the extent required to cause the piston rod 20 to move to the left or to the right, as the case may be, to bring the regulator sectors 33 and 34 into the center or neutral position. Voltage divider 40 is so designed that when the sector 33 is in the neutral position, the excitation supplied to coil 25 through sector 33 is sufficient to equalize the pressures on piston faces 17 and 19 and retain sector 34 in the center position.

While no strip is between the stands, voltage divider 49 is connected in the field circuit of exciter winding 43 through a circuit comprising voltage divider 49, contacts 62b of switch 62, winding 43, voltage divider 51, and speed adjusting voltage divider 52 back to source 30. The voltage component impressed on winding 43 by voltage divider 49 is equal to the voltage component which would be supplied to winding 43 by sector 34 and voltage divider 41 if sector 34 were in circuit with winding 43 and occupied its neutral or center position.

When the strip 1 enters the rolls 3 of the second stand of the mill, its initial tension can be adjusted by voltage divider 52. This tension, communicated to piston 5 through roller 6, causes the pressure in cylinder 4 and pipe 8 to increase. Such increase in pressure actuates switch piston 56e to open contacts 56a and to close contacts 56b and 56c of switch 56. Closure of contacts 56c and 56b of switch 56. Closure of contacts 56c energizes coil 62c from source 30 through a circuit comprising contacts 56c, coil 62c, and contact 60a back to source 30. Energization of coil 62c closes contacts 62a and opens contacts 62b, thereby substituting the voltage of sector 34 and voltage divider 41 for the voltage of voltage divider 49 in the circuit of field winding 43.

If the voltages supplied to field winding 43, first by voltage divider 49 and thereafter by sector 34 and voltage divider 41, were of different values, the voltage applied to motor 36 would vary when the strip entered rolls 3. Such a variation in voltage is undesirable because, depending upon the direction of the voltage variation, the motor 36 would momentarily produce either too much torque and possibly cause the strip to become excessively slack between the stands, or too little torque and break the strip. This invention eliminates the possibility of such occurrences by the equalization of voltages described above, which causes motor 36 to produce the proper torque, and results in an even tensioning of the strip when the strip enters rolls 3.

Closure of contacts 56b connects solenoid valve coil 25 with source 30 through a circuit comprising coil 25, contacts 56b and voltage divider 29 back to the source. Tension adjusting voltage divider 29 may then be adjusted to cause valve 24 to set the desired tension of the strip, as registered by gauge 31.

If the actual tension in strip 1 is less than the desired tension, the pressure against piston face 17 becomes less than the pressure against piston face 19, and piston rod 20 moves to the left. Such movement of piston rod 20 actuates regulator sector 34 which produces a controlling effect by decreasing the voltage applied to exciter field 43. This decrease in excitation of field 43, in response to the differential controlling effects of sector 34 and voltage divider 51, lowers the ampere turns of field 43, lowering the ouput of exciter 39 and consequently decreasing the excitation of generator field winding 38. With decreased field excitation, the output of generator 37 is lowered, reducing the torque of the first stand motor 36. This reduction in torque of motor 36 relative to the torque of motor 44 causes motor 44 to increase the tension in the strip. As the tension in the strip increases, the pressure applied to piston face 17 increases, opposing the movement of piston rod 20 to the left. When the tension in the strip has returned to the desired value, the pressures on piston faces 17 and 19 are equalized and the movement of piston rod 20 and regulator sector 34 is stopped.

The position at which regulator sector 34 stops is such as to provide a new value of excitation for exciter generator 39 which will produce in motor 36 the torque required to maintain the strip tension constant. Should the tension in the strip exceed the desired value, the movement of piston rod 20 and regulator sector 34 to return the tension to normal is the reverse of that described above.

When the strip 1 leaves the rolls of the first stand, the tension in the strip is released and the fluid pressure in pipe 8 is reduced. This reduction in pressure actuates switch 56 to close contacts 56a and to open contacts 56b, thereby substituting sector 33 for voltage divider 29 in the circuit of valve coil 25. Switch 56 also opens contacts 56c to deenergize coil 62c of switch 62, thereby opening contacts 62a and closing contacts 62b. Voltage divider 49 is thereby substituted for sector 34 and voltage divider 41 in the circuit of field winding 43, and the rheostat means comprising sector 34 and voltage divider 41 is rendered ineffective. The tendency of piston rod 20 and sector 34, upon release of the pressure against piston face 17, is to move to the left under the action of the pressure applied to piston face 19 by pump 7. This tendency is counteracted by the operation of sector 33 described above and sector 34 is maintained in a neutral position in the absence of a strip between stands.

For manual operation of the system, switch 60 is thrown to its lower position, opening contact 60a. The switch 60 also disconnects motor 67 from source 70, but maintains motor 68 energized to continue driving pump 11 for supplying fluid to cylinder 4. Opening the contact 60a of switch 60 breaks the energizing circuit of coil 62c of switch 62, opening contacts 62a and closing contacts 62b. This action of switch 62 substitutes the voltage of voltage divider 49 for the voltage of sector 34 and voltage divider 41 in the circuit of field winding 43. Gauge 27 indicates the tension in the strip 1 and by manually adjusting the speed adjusting voltage divider 52 in either direction in accordance with variations in the strip tension, the tension may be maintained at a predetermined value, and such value may be varied at will.

To shut down the regulating system, line switch 66 is opened, deenergizing motors 67 and 68 and stopping pumps 7 and 11. Opening of switch 66 closes contacts 66a, energizing coil 14 of solenoid valve 13 to open the valve. Oil from cylinder 4 and pipe 8 then drains through pipes 8 and 15 into reservoir 10.

Although but one embodiment of the present invention has been shown and described, it will apparent to those skilled in the art that various changes and modifications may be made therein without departing from the spirit of the invention or from the scope of the appended claims. In particular, the embodiment of the invention illustrated relates to the control of the motor of the first stand of a rolling mill. It will be apparent, however, that the invention could be applied to any of a plurality of driving means associated with work devices arranged in spaced relation for simultaneously working a piece of material extending between such work devices.

It is claimed and desired to secure by Letters Patent:

1. In a system for controlling two electric motors driving a common load, a first supply of fluid variable in pressure in accordance with variations in a characteristic of said load, a second supply of fluid under pressure adjustable in accordance with the desired value of said characteristic, rheostat means differentially responsive to the pressures of said first and second fluid supplies for producing a first control voltage, means responsive to the voltage of one of said motors for producing a second control voltage, means responsive to the voltage of the other of said motors for producing a third control voltage, control means responsive to said control voltages for controlling one of said motors to maintain said characteristic at substantially said desired value and to substantially maintain a predetermined ratio between the speeds of said motors, and means connected to said load responsive to removal of said load from said motors for rendering said rheostat means ineffective to control said one motor and for substantially maintaining said predetermined ratio between the speeds of said motors.

2. In a system for controlling two electric motors driving a common load, a first supply of fluid under pressure, a piston actuated by said load responsive to variations in a characteristic of said load for varying the pressure of said supply of fluid, a second supply of fluid under pressure, means for adjusting the pressure of said second supply in accordance with variations in the desired value of said characteristic, piston means differentially responsive to the pressures of said first and second supplies of fluid, a rheostat actuated by said piston means to produce a first control voltage, means responsive to the voltage of one of said motors for producing a second control voltage, means responsive to the voltage of the other of said motors for producing a third control voltage, control means jointly responsive to said control voltages for controlling one of said motors to maintain said characteristic at substantially said desired value and to substantially maintain a predetermined ratio between the speeds of said motors, and switch means connected to said load responsive to removal of said load from said motors for rendering said control means unresponsive to said first control voltage and for substantially maintaining said predetermined ratio between the speeds of said motors independently of the values of the speeds of said motors.

3. In a system for controlling two electric motors driving a common load, a first supply of fluid under pressure, a piston responsive to variations in a characteristic of said load for varying the pressure of said supply of fluid, a second supply of fluid under pressure, solenoid valve means for adjusting the pressure of said second supply in accordance with changes in the desired value of said characteristic, piston means differentially responsive to the pressures of said first and second supplies of fluid, rheostat means actuable by said piston means in two directions from a neutral position for producing a first control voltage having a predetermined magnitude when said rheostat means is in said neutral position, means responsive to the voltage of one of said motors for producing a second control voltage, means responsive to the voltage of the other of said motors for producing a third control voltage, field winding means jointly responsive to said variable voltages for controlling one of said motors to maintain said characteristic at substantially said desired value and to substantially maintain a predetermined relation between the speeds of said motors, switch means connected to said load responsive to removal of said load from said motors for rendering said field winding means unresponsive to said first control voltage and for applying a constant voltage having said predetermined magnitude to said field winding means to substantially maintain said predetermined relation between the speeds of said motors independently of the values of the speeds of said motors, and a rheostat actuated by said piston means responsive to removal of said load from said motors for adjusting the excitation of said solenoid valve means to cause said piston means to move said rheostat means into substantially said neutral position, whereby the speeds of said motors remain substantially in said predetermined relation upon reapplication of said load to said motors.

4. In a system for controlling two electric motors driving a common load, a first supply of fluid under pressure, a piston responsive to variations in a characteristic of said load for varying the pressure of said first supply of fluid, a second supply of fluid under pressure, solenoid valve means for adjusting the pressure of said second supply in accordance with changes in the desired value of said characteristic, piston means differentially responsive to the pressures of said supplies of fluid, a rheostat actuable by said piston means in two directions from a neutral position for producing a first control voltage having a predetermined magnitude when said rheostat is in said neutral position, means responsive to the voltage of one of said motors for producing a second control voltage, means responsive to the voltage of the other of said motors for producing a third control voltage, control means jointly responsive to said control voltages for controlling one of said motors to substantially maintain said characteristic at said desired value and to substantially maintain a predetermined ratio between the speeds of said motors, and switch means connected to said load responsive to removal of said load from said motors for substituting a constant voltage having said predetermined magnitude for said first control voltage to substantially maintain said ratio between the speeds of said motors independently of the values of the speeds of said motors.

References Cited in the file of this patent

UNITED STATES PATENTS

| Number | Name | Date |
|---|---|---|
| 2,105,824 | Simonds | Jan. 18, 1938 |
| 2,300,990 | Stoltz | Nov. 3, 1942 |
| 2,325,381 | Edwards | July 27, 1943 |
| 2,342,767 | Stoltz | Feb. 29, 1944 |
| 2,348,695 | Reichert | Mar. 10, 1944 |
| 2,365,896 | Michel | Dec. 26, 1944 |
| 2,508,153 | Frisch | May 16, 1950 |
| 2,590,666 | Winchester et al. | Mar. 25, 1952 |

FOREIGN PATENTS

| Number | Country | Date |
|---|---|---|
| 425,399 | France | June 9, 1911 |